Patented Jan. 12, 1954

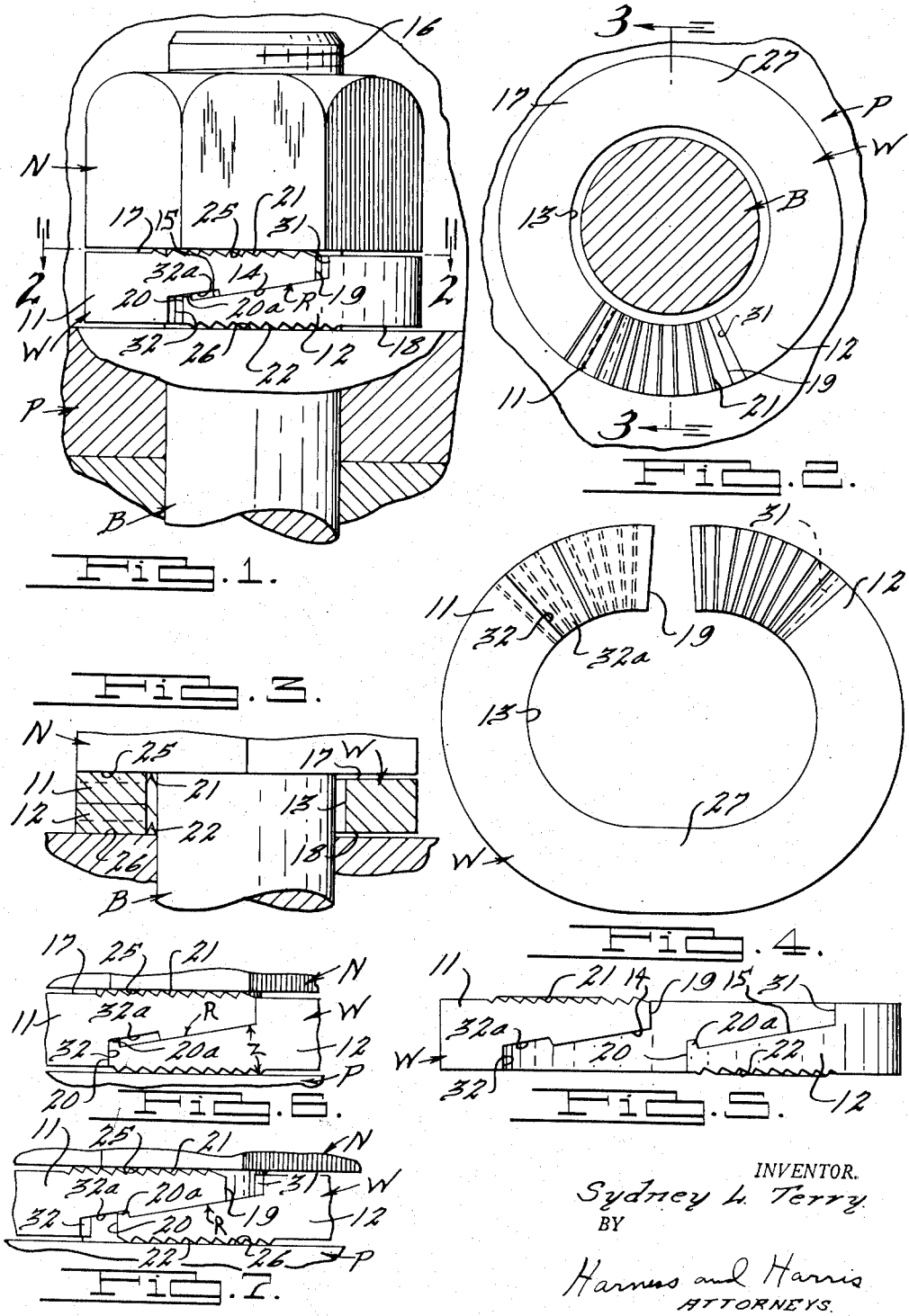

2,665,729

UNITED STATES PATENT OFFICE 2,665,729

SPLIT LOCK WASHER HAVING MOVEMENT LIMITING MEANS

Sydney L. Terry, St. Clair Shores, Mich., assignor to Chrysler Corporation, Highland Park, Mich., a corporation of Delaware Application June 15, 1950, Serial No. 168,281

5 Claims. (Cl. 151—36)

This invention relates to lockwashers or so-called nut locks having a wedge-type locking ramp provided between the overlapped ends of the split-ring type of lockwasher. This locking ramp is arranged such that it cooperates with the exposed, overlapped, serrated faces of the lockwasher in such a manner that the lockwasher effectively resists any tendency of the associated nut to back off or unscrew itself from its threadably engaged bolt once the nut has been screwed up on the bolt so as to compress the lockwasher between the nut and associated work piece. The arrangement of the ramp means is such that wedging, nut locking forces are developed as the nut tends to back off the bolt and these wedging forces urge the nut into a tighter engagement with the associated bolt and work piece. Accordingly, unintended or accidental displacement of the nut is prevented. As a result of the wedging action developed when the nut tends to back off of the bolt, this lockwasher construction has the inherent property of requiring a breakaway torque for removing the nut of greater magnitude than the tightening torque used to apply the nut. The invention disclosed and claimed herein is an improvement on the lockwasher disclosed in my co-pending application, Serial No. 117,305, filed on September 23, 1949, now U. S. Patent 2,581,217.

It has been found that during installation of a lockwasher of the type herein disclosed that rotation of the nut member, as it is screwed up on the associated bolt, has a tendency to spread apart the overlapped, serrated, locking ramp ends of the lockwasher. In extreme cases this deformation of the lockwasher during installation may be sufficient to materially impair the operability of the lockwasher. This spreading apart of the overlapped, serrated ramp ends of the lockwasher results from the fact that as the lockwasher is compressed between the nut and associated work piece, during tightening of the nut on the bolt, the serrated, opposed, faces of the lockwasher tend to bite into the adjacent portions of the nut and work piece with the result that the free ends of the lockwasher may be spread apart with subsequent tightening of the nut. To prevent more than the desired and permissible deformation of the lockwasher during nut tightening, there is formed on the overlapped ramp ends integral means for limiting the amount of spreading apart of the free ends of the lockwasher.

It has also been found that with lockwashers of the type herein disclosed that the more the nut is rotated in an unscrewing direction, after its installation, that the greater the wedging locking forces becomes. Accordingly, under certain circumstances removal of the nut from the bolt may result in a stripping of the threads on the nut or bolt before one is able to actually remove the nut from the bolt. The improved form of positive lockwasher herein disclosed includes integrally formed means to control and limit the amount of locking action that is provided by the inclined, overlapped, washer end ramps and thus provide a means for reducing the thread stripping that might result from nut removal.

It is a primary object of this invention to provide a lockwasher with overlapped, wedge-type, locking ramps that include integrally formed means to resist spreading apart of the overlapped ramps and integrally formed means to control the locking action of the lockwasher.

It is another object of this invention to provide a lockwasher or nut lock of simplified design that may be easily manufactured and installed and yet one that includes novel means for effectively restraining accidental or unintended removal of the nut from its associated bolt.

It is a further object of this invention to provide a lockwasher with an integrally formed wedging ramp that provides a means for controlling the locking or the breakaway torque required to unscrew the associated nut from its supporting bolt once the nut has been threaded into position against the lockwasher.

It is an additional object of this invention to provide a unitary lockwasher construction having integrally formed means for resisting unscrewing of the nut from the associated bolt and for controlling the breakaway torque required to release the nut from its associated bolt, the lockwasher also including integrally formed means to prevent deformation of the washer during its installation on the work piece.

Other objects and advantages of this invention will become apparent from a reading of the attached specification and a consideration of the related drawings wherein:

Fig. 1 is a fragmentary side elevational view, partly in section, of a bolt and nut connection to a work piece that includes a lockwasher embodying this invention;

Fig. 2 is a sectional elevational view taken along the line 2—2 of Fig. 1;

Fig. 3 is a sectional elevational view taken along the line 3—3 of Fig. 2;

Fig. 4 is a plan view of the lockwasher prior to its shaping to final form;

Fig. 5 is a side elevational view of the lockwasher shown in Fig. 4;

Fig. 6 is a fragmentary elevational view of the relative positions of the overlapped washer ends when maximum locking action is achieved, and Fig. 7 is a fragmentary elevational view of the relative positions of the overlapped washer ends when the ends have been spread apart the maximum amount permissible during nut installation.

In Figs. 1–3 of the drawings a bolt B is shown connected to a work piece P by means of the nut N and lockwasher W. The lockwasher W and nut N are each mounted in conventional fashion on the threaded end of the bolt B that protrudes from the work piece P. Washer W is compressed between the nut N and work piece P when the nut N is screwed up on bolt B.

The lockwasher or nut lock W that embodies this invention is a flexible, flat, ring-like, member provided with overlapping, wedge-type locking ends 11 and 12 respectively. The bore 13 that pierces the lockwasher W is of such a size that the lockwasher fits loosely about the associated bolt B. The inwardly disposed, adjacent faces 14 and 15 of the overlapping washer ends 11 and 12, respectively, are formed to have face to face engagement along the inclined plane or wedge ramp R. To insure face to face engagement during flexing of the washer ends 11, 12 it is preferable to have the ramp R formed as a portion of a helix although a straight line configuration may be used satisfactorily.

The wedge ramp surface R is arranged so that it will develop nut locking forces whenever there is any tendency of the nut N to back off or unscrew itself from the bolt B. The angle Z of the inclined ramp R may be varied to vary the breakaway torque of the nut as is subsequently explained but this angle should always be greater than the lead of the threads 16 of the bolt B in order to provide the desired nut locking effect.

The outwardly disposed faces 17 and 18 of the overlapping washer locking ends 11 and 12 include the radially extending ratchet teeth or serrations 21 and 22 respectively. It will be noted that the teeth 21 and 22 are sloped in opposite directions and arranged such that on clockwise rotation of the nut N, to thread the nut on the bolt B, the end surface 25 of the nut N may slide across the washer teeth 21 and the washer teeth 22 may slide across the end surface 26 of the work piece P. However, when the nut N subsequently tends to rotate counterclockwise to back off of the bolt B, then the teeth 21 will dig into the nut end surface 25 and the teeth 22 will dig into the work piece surface 26. Consequently, relative rotation between the nut N, washer W and work piece P is restrained on any unscrewing movement of nut N after the nut has once been installed on the bolt B with the lockwasher compressed between the nut N and work piece P.

From Fig. 1 it will be noted that the end edges or walls 19 and 20, of the overlapping washer ends 11 and 12 respectively, do not normally extend along the full length of the ramp surface R. By terminating the end edges 19 and 20 inwardly of the ends of the ramp R relative circumferential movement between the overlapping ends 11 and 12 is facilitated. This arrangement whereby the overlapping ends 11, 12 may move circumferentially relative to each other when the nut N tends to back off the bolt B is an essential feature of this lockwasher for the relative circumferential movement of the ends 11 and 12 increases the thickness of the washer in the region of the overlapped ends 11, 12 and produces the nut locking action described in detail below.

It will be noted that the end wall 19 of the overlapped washer end 11 is flat and substantially perpendicular to the washer face 17. Likewise, a flat wall 31 is formed on the overlapped washer end 12 at one end of the ramp R. The wall 31 is also perpendicular to the washer face 17. Wall 31 is normally spaced circumferentially from the wall 19 so that as the nut N tends to back-off or unscrew itself from the bolt B, the wall 19 may move circumferentially until it abuts against the wall 31. In moving towards the wall 31, the wall 19 and associated washer end 11 are moved up the ramp R and this expands the overlapped ends 11, 12 of the washer W so as to produce the aforementioned nut locking action. This action is more specifically described subsequently. Obviously when wall 19 abuts the wall 31 there is no further expansion of the overlapped washer ends 11, 12 and consequently the amount of locking is thus limited. It is thus possible to more or less definitely establish the breakaway torque required to remove a nut from a bolt that has a lockwasher of the type herein disclosed associated with it in the manner shown. By controlling the angle of the ramp R and the amount of permissible relative circumferential movement between the end walls 19 and 31 the degree and amount of washer expansion and nut locking action can thus be definitely controlled. Fig. 6 shows the position of the washer ends 11, 12 when the maximum nut locking action is being obtained.

The end wall 20 of the washer end 12 is extended as shown to provide the tooth formation 20a. Likewise, the portion of the washer end 11 along the ramp R and adjacent the end wall 32 is cut away to provide the slot or channel formation 32a which is adapted to receive the tooth 20a on the washer end 12. The slot or channel 32a is of such a size that it readily permits a certain amount of relative circumferential movement of the overlapped washer ends 11, 12. During installation of a nut on a bolt having a lockwasher of the type herein disclosed associated with it, it is possible that the nut will tend to spread the overlapped ends 11 and 12 apart. The cooperating formations 20a, 32a limit this amount of washer deformation or end spreading and thus prevent any harmful deformation of the washer during nut tightening. Fig. 7 shows the overlapped washer ends 11, 12 when they have been spread apart the maximum permissible distance.

From Figs. 2 and 4 it will be noted that the radially extending ratchet teeth or serrations 21, 22 on the exposed faces 17, 18 of the washer need extend along only a small circumferentially disposed portion of the washer adjacent each of the overlapping end edges 19, 20. Furthermore, the serrations 21, 22 are opposite the ramp formations 14, 15 on each end of the washer. As a result of this arrangement the serrations 21, 22 and ramp inclines 14, 15 may be formed at the same time during fabrication of the washer after which the washer is bent to final circular form. This lockwasher construction is therefore economical and easy to fabricate by conventional machinery.

When the lockwasher W is mounted around the bolt B and the nut N is screwed up on the bolt B so as to compress the washer W between the nut N and piece P, it is thought to be obvious that the washer teeth 21 and 22 will be forced into engagement with the surface 25 of the nut N and the surface 26 of the work piece P. The shape of the teeth 21 and 22 is such as to permit the nut N to be tightened after original contact with the washer W. The teeth 21 and 22 permit the nut N to rotate clockwise relative to the washer W and the washer W may rotate clockwise relative to the work piece P. As the pressure increases between the nut, washer and work piece on increased tightening of the nut, there is a tendency for the teeth 21 to bite into the nut surface 25 and the teeth 22 to bite into the work piece surface 26 so that subsequent tightening of the nut N tends to move the overlapping free ends 11 and 12 apart or to expand them in a circumferential direction. The amount of expansion will be limited by the tooth and slot formations 20a, 32a. This relative circumferential expansion of the washer ends 11, 12 on nut tightening amounts to an outwardly hinging movement of the washer ends about the diametrically disposed pivoting or hinging portion 27 of the washer. In moving outwardly on nut tightening, the overlapping ends 11, 12 of the lockwasher slide outwardly along the ramp surface R and tend to reduce the thickness of the lock-washer in the region of the overlapping ends. From Fig. 3, it is obvious that the normal thickness of the overlapping ends 11, 12 may be slightly greater than the thickness of the diametrically disposed hinging or pivoting portion 27 of the washer. Consequently, when the overlapping ends 11, 12 have been expanded sufficiently such that the thickness of the washer at the overlapped ends is equal to the thickness of the washer at the other points along its circumference, then outward hinging of the ends 11, 12 ceases. This outward hinging movement of the washer ends 11, 12 on nut tightening tends to tension the washer so that the ends 11, 12 will be urged to contract towards each other at all times even though the nut remains stationary relative to the associated bolt. Accordingly, the tension forces set-up in the washer on nut tightening movement provides a means that urges the washer ends 11, 12 to contract towards each other circumferentially and this tends to slide the ends 11, 12 inwardly along the ramp R in a direction that will develop wedging forces that act to more securely anchor the nut in its tightened position.

If variations in the bolt loading, or temperature changes, or the like, should develop stresses and strains between the threadably engaged portions of the bolt and nut such that the nut N would tend to rotate in a counterclockwise direction and thereby back off the bolt B, the washer construction herein disclosed will effectively prevent such unintended or accidental displacement of the nut N. On any movement of the nut N in a counterclockwise direction the washer teeth 22 bite into the surface 26 of the work piece P and the washer teeth 21 bite into the end surface 25 of the nut N to thereby prevent relative rotation between the nut washer and work piece. Consequently, any movement of the nut N in a counterclockwise direction will circumferentially contract the overlapping ends 11, 12 of the washer W about the bolt B. Contraction of the overlapping washer ends 11, 12 about the bolt B will move the ends 11, 12 inwardly along the ramp R in a direction that will urge the overlapping ends 11, 12 axially apart and this separating movement of the ends 11, 12 will increase the thickness of the washer W along the ramp portion and more firmly wedge the nut, washer and work piece together and thereby anchor the nut N against unscrewing movement.

While the teeth 21, 22 are shown as the means for resisting relative movement between the nut, washer and work piece on unscrewing movement of the nut, this invention is not to be restricted to this particular construction. It is thought to be obvious that any means that will provide a coefficient of friction between the surfaces 17, 25 and 18, 26 that is greater than the coefficient of friction between the ramp surfaces 14, 15 will produce an operative lockwasher in accordance with the teachings herein provided the inclination of the ramp R is equal to or greater than the lead of the screw threads 16 on the bolt B and the mating threads on the nut N.

From the above it is thought to be obvious that the washer construction herein disclosed provides an economical, highly efficient, simplified type of positive lockwasher or nut lock that will effectively prevent accidental or unintended release of a nut from the bolt with which the nut is threadably associated. Furthermore, the washer is a single unitary element that can not be incorrectly applied so that it will not function properly. In addition, integrally formed means are provided to control the locking action and breakaway torque of a nut installed with a washer of this type and to also prevent undesired spreading apart of the overlapped washer ends during nut installation. To adapt this washer for left handed threaded bolts and nuts it is merely necessary to reverse the angularity of the ramp incline and the direction of slope of the ratchet teeth.

I claim:

1. A lockwasher comprising a substantially flat unitary split ring of flexible material having overlapping end portions formed with inwardly disposed, circumferentially extending ramp faces slidably engageable along an inclined plane extending transversely of the axis of the ring, said end portions each having outwardly disposed faces formed with friction grip means adapted to be frictionally engaged with the surfaces of elements placed adjacent thereto, said overlapping end portions including interengageable tooth and slot means to limit the relative circumferential movement of the overlapped end portions in a ring contracting direction to provide a means for controlling the magnitude of the locking action of the lockwasher, the coefficient of friction of said friction grip means on the outwardly disposed faces of said overlapped end portions being greater than the coefficient of friction between the inwardly disposed, slidably engageable ramp faces of said overlapped end portions.

2. A lockwasher comprising a unitary split ring of flexible material having overlapping end portions each formed with oppositely arranged inwardly and outwardly disposed faces, said inwardly disposed faces providing circumferentially extending ramp surfaces slidably engageable along an inclined plane extending between the outwardly disposed faces of the lockwasher, the outwardly disposed faces of said overlapping end portions including preformed friction grip portions adapted to be engaged with the surfaces of elements placed adjacent thereto, the thickness of said washer in an axial direction along the overlapping end portions normally being slightly greater than the thickness of the washer at other portions around its circumference, and integrally formed engageable tooth and slot means on the overlapping end portions arranged to limit circumferential contraction and expansion of the overlapping end portions relative to each other to provide means to respectively control pre-stressing of the washer and limit deformation thereof during expansion of said washer end portions and to also control the magnitude of the locking action of the washer during contraction of said washer end portions, the coefficient of friction of said friction grip means on the outwardly disposed faces of said overlapped end portions being greater than the coefficient of friction between the inwardly disposed, slidably engageable ramp surfaces of said overlapped end portions.

3. A lockwasher comprising a substantially flat unitary split ring of flexible material having overlapping end portions formed with inwardly disposed, circumferentially extending ramp faces slidably engageable along an inclined plane extending transversely of the axis of the ring, said end portions each having outwardly disposed faces formed with radially extending serrations that are arranged to slope in opposite directions and adapted to be frictionally engaged with the surfaces of elements placed adjacent thereto, said inwardly disposed slidably engageable ramp faces of the overlapping end portions including engageable tooth and slot formations arranged to limit the circumferential expansion and contraction of the overlapping end portions to provide means to respectively control pre-stressing of the washer and limit deformation thereof during expansion of said washer end portions and to also control the magnitude of the locking action of the washer during contraction of said washer end portions, the coefficient of friction between said serrations and the surfaces engageable therewith being greater than the coefficient of friction between said slidably engageable, inwardly disposed ramp surfaces of the overlapping lockwasher end portions.

4. A lockwasher comprising an integral, flexible, split ring having overlapping ends with the adjacent, inwardly disposed faces slidably engageable along an inclined plane extending between the outwardly disposed faces of the ring so as to provide a ramp means for axially separating said overlapping ends on relative circumferential movement between said ends, friction grip means on the outwardly disposed faces of said washer ends adapted to be frictionally engaged with elements disposed adjacent the outwardly disposed faces of said overlapping ends, and integrally formed movement limiting abutment means on said overlapping ends engageable after a predetermined relative circumferential movement between said ends to limit said relative circumferential movement of said ends, said abutment means controlling circumferential separation of said overlapping washer ends to limit the washer deformation and the pre-stressing of the washer during installation and to limit the contraction of the overlapping washer ends so as to limit the locking action of the lockwasher.

5. A lockwasher adapted to be mounted on a threaded member comprising a unitary split ring of flexible material having bevel cut, overlapping, end portions each of which is formed with opposed, inwardly and outwardly disposed faces, said inwardly disposed faces of the washer end portions being frictionally and slidably engageable along an inclined plane extending between the outwardly disposed faces of the lockwasher wherein the plane inclination is in the same direction as but is of greater degree than the pitch of the threads of the threaded member on which the washer is mounted, said outwardly disposed faces of said washer overlapping end portions each including radially extending, serrated friction grip means adapted to be frictionally engaged with the surfaces of elements placed adjacent thereto, said washer having a thickness in an axial direction along the portions of overlapping ends that is slightly greater than the thickness of the washer at other locations around the circumference thereof, and interengageable abutment means on said overlapping end portions to limit the relative circumferential movement between the overlapping washer end portions in each direction so as to control deformation of the washer and pre-stressing thereof during separation of the washer overlapping ends and to control the locking action of the washer during contraction of the washer overlapping ends, the condition of the said faces of the washer end portions being such that coefficient of friction between said friction grip means and the material engaged therewith is greater than the coefficient of friction between the slidably engaged, inwardly disposed faces of the washer end portions.

SYDNEY L. TERRY.

References Cited in the file of this patent

UNITED STATES PATENTS

| Number | Name | Date |
|---|---|---|
| 447,738 | Pritschau | Mar. 3, 1891 |
| 1,191,565 | Chambers | July 18, 1916 |
| 1,220,983 | Haptonstall | Mar. 27, 1917 |
| 2,262,439 | Simpson | Nov. 11, 1941 |
| 2,581,217 | Terry | Jan. 1, 1952 |

FOREIGN PATENTS

| Number | Country | Date |
|---|---|---|
| 111,778 | Great Britain | Dec. 13, 1917 |
| 459,063 | Germany | Mar. 10, 1927 |
| 489,221 | Germany | Jan. 15, 1930 |